United States Patent
Escobar Olmos et al.

(10) Patent No.: US 9,852,466 B2
(45) Date of Patent: Dec. 26, 2017

(54) APPROVING GROUP PURCHASE REQUESTS

(71) Applicant: INTERNATIONAL BUSINESS MACHINES CORPORATION, Armonk, NY (US)

(72) Inventors: Victor Rafael Escobar Olmos, Vilafranca del Penedes (ES); Jakob C. Lang, Boeblingen (DE); Tomas Libal, Kralove (CZ); Angel Nunez Mencias, Boeblingen (DE); Fabian Romanowski, Karlsruhe (DE); Sven Sterbling, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 14/073,183

(22) Filed: Nov. 6, 2013

(65) Prior Publication Data

US 2014/0164189 A1    Jun. 12, 2014

(30) Foreign Application Priority Data

Dec. 12, 2012  (GB) .................................. 1222330.1

(51) Int. Cl.
    G06Q 30/06         (2012.01)
    G06F 17/00         (2006.01)
(52) U.S. Cl.
    CPC ............................... G06Q 30/0637 (2013.01)
(58) Field of Classification Search
    USPC ......................................................... 705/26
    See application file for complete search history.

(56) References Cited

U.S. PATENT DOCUMENTS

| | | | |
|---|---|---|---|
| 6,910,018 B1 * | 6/2005 | Okada | G06Q 30/02 705/26.2 |
| 7,131,071 B2 | 10/2006 | Gune et al. | |
| 7,350,698 B2 | 4/2008 | Viswanath et al. | |
| 8,285,573 B1 * | 10/2012 | Ballaro | G06Q 10/087 705/22 |
| 8,924,269 B2 * | 12/2014 | Seubert | G06Q 10/06 705/35 |

(Continued)

FOREIGN PATENT DOCUMENTS

WO        WO0319323 A2      3/2003

*Primary Examiner* — Garcia Ade (74) *Attorney, Agent, or Firm* — Heslin Rothenberg Farley & Mesiti P.C.

(57) ABSTRACT

Approving a group purchase request for a group of articles. A sub-group of articles is selected, wherein a unique article approval index is assigned to each of the articles and a highest article approval index is determined among the unique article approval indexes of the articles of the group, wherein the article of the group is selected into the sub-group if the article of the group complies with at least one of following article selection criteria: the unique article approval index of the article of the group is above a predetermined approval index threshold and the unique approval index of the article of the group is equal to the highest article approval index; approving the group purchase request for the group if the group purchase request for the sub-group is approved; and rejecting the group purchase request for the group if the group purchase request for the sub-group is rejected.

9 Claims, 6 Drawing Sheets

(56) References Cited

U.S. PATENT DOCUMENTS

2003/0046176 A1 3/2003 Hynes
2003/0139971 A1 7/2003 Rescigno et al.
2011/0153458 A1 6/2011 Wong et al.

* cited by examiner

APPROVING GROUP PURCHASE REQUESTS

PRIOR FOREIGN APPLICATION

This application claims priority from the United Kingdom patent application number 1222330.1, filed Dec. 12, 2012, which is hereby incorporated herein by reference in its entirety.

BACKGROUND

Currently there are several software solutions that automate business process execution. Typical examples of these software solutions are: IBM Business Process Manager, IBM Web Sphere Business Modeler Advanced, and IBM Operational Decision Manager. Automated article purchase is one of the widest application areas for automated business process execution software, since almost every medium-sized or big company purchases various articles necessary for daily business operation from external suppliers. Despite big variety of article purchases, activities of companies, and organizational structures of the companies there is a "common denominator" in various article purchase processes, i.e. the article purchases have to be approved by approval instances. These approval instances can be employees of the companies, employees of the external suppliers of the companies, various external/internal software, etc. These approval instances are requested to approve or reject purchase requests of the articles or groups of the articles initiated by employees of the companies. A volume of articles being purchased can be high and even when processing of the article purchase requests is supported by various automated business process execution software, article purchase approval/rejection might become a responsibility of full-time purchasing professional people.

BRIEF SUMMARY

One or more aspects of the present invention provide for embodiments that fill the need of an effective article purchase approval process. It should be appreciated that aspects can be implemented in numerous ways, including as a computer implemented method, an apparatus, a computer system, a computer code, one or more machine readable media embodying computer instructions causing a computer to perform a method, or a device. Several embodiments are described herein.

In one embodiment, a computer implemented method for approving a group purchase request for a group of articles, wherein the group comprises at least one article, is provided. The method includes, for instance, selecting a sub-group of articles, wherein a unique article approval index is assigned to each of the articles of the group of articles and a highest article approval index is determined among the unique article approval indexes of the articles of the group, wherein an article of the group is selected into the sub-group based on the article of the group complying with at least one of the following article selection criteria: the unique article approval index of the article of the group is above a predetermined approval index threshold, the unique article approval index of the article of the group is equal to the highest article approval index; approving the group purchase request for the group based on approval of a group purchase request for the sub-group; and rejecting the group purchase request for the group, based on rejection of the group purchase request for the sub-group.

BRIEF DESCRIPTION OF THE SEVERAL VIEWS OF THE DRAWINGS

One or more aspects of the present invention will be readily understood by the following detailed description in conjunction with the accompanying drawings.

DETAILED DESCRIPTION

One or more aspects of the present invention provide an effective article purchase approval process. One or more aspects provide advanced solutions for the process definition tools and the workflow engines. These process definition tools and work flow engines can be parts of software for automated business process execution. These software may further comprise: one or more tool agents for communicating with invoked applications, one or more administration and monitoring tools, one or more work list handlers, other workflow engines and process definition tools, etc. One aspect of the present invention provides for effective approval of a group purchase request for a group of articles by approving only the group purchase request for a sub-group of articles, wherein articles of the group are selected into the sub-group according to the article selection criteria that does not compromise the quality of the approval of the group purchase request for the group of articles. In other words, aspects of the present invention enable simplification and/or acceleration of approval process performed by the workflow engines. Another aspect of the present invention relates to an automation of the process definition tools. Definition of an approval sequence/process of an additional article can be done in an automated way, wherein the additional article is an article that has to be purchased for the first time. The approval sequence/process of the additional article is constructed out of approval sequence/process of similar articles according to predefined/preprogrammed construction rules, wherein similar articles are identified using preprogrammed/predefined selection criteria. Automation of the process definition tools clearly accelerates performance of these tools by reducing a need for interaction with users/operators of the business definition tools. Moreover automation of the process definition tools may result in integration of those into the workflow engines.

Several exemplary embodiments for a computer implemented method, a computer system, and one or more machine readable storage media embodying computer instructions causing a computer to perform the method of approving a group purchase request for a group of articles will now be discussed. It will be apparent to those skilled in the art that aspects of the present invention may be practiced without some or all specific details set forth therein.

Figure 1:
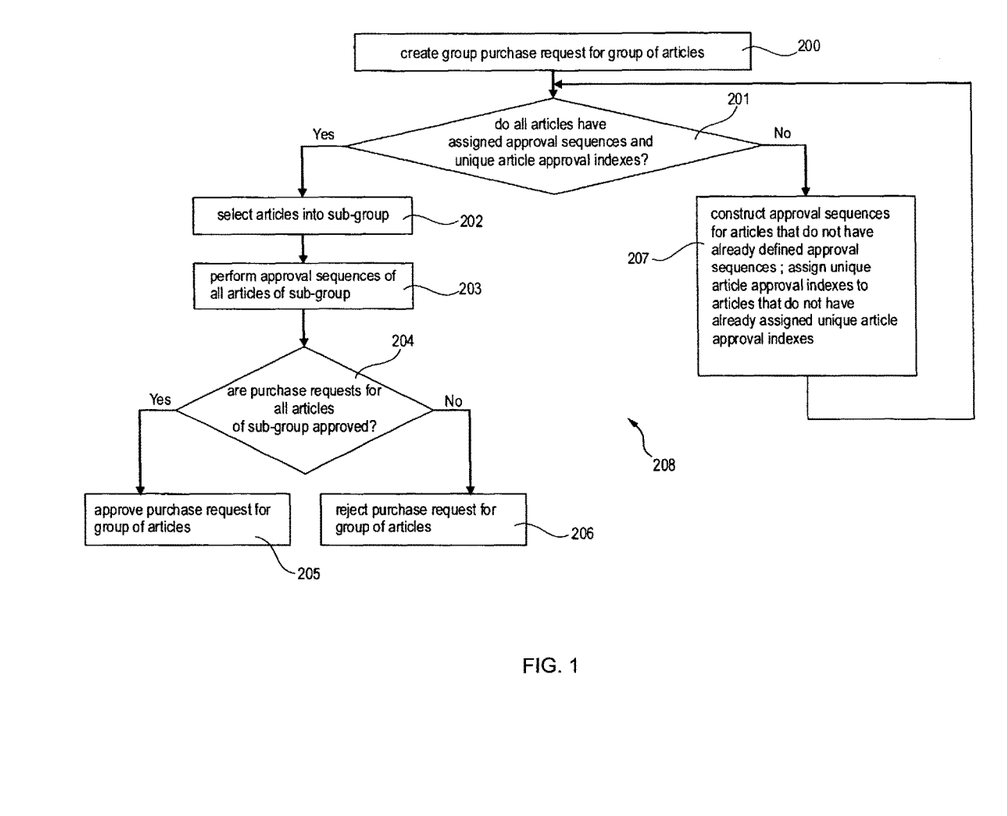
FIG. 1 is a flowchart illustrating approval/rejection of a group purchase of a group of articles, in accordance with an embodiment of the present invention.

FIG. 1 illustrates a flow chart for approving the group purchase request 208 for the group of articles. A process block 200 in FIG. 1 represents initiation of approval of the group purchase request for the group of articles, wherein the group purchase request for the group of articles is created. The group purchase request comprises articles purchase requests of each of the articles of the group.

A decision block 201 in the FIG. 1 represents controlling whether unique approval indexes and approval sequences are assigned to all articles of the group. If no, an operation 207 is executed next. If yes, a process block 202 is executed next. The approval index of the article is a measure of importance of this article among other articles. Approving the article purchase request for each of the articles is performed according to the dedicated approval sequence.

The process block 207 in the FIG. 1 represents construction of approval sequences for the articles of the group that do not have the approval sequences. The operation 207 further represents assignment of unique article approval indexes to the articles of the group that do not have assigned unique article approval indexes.

The process block 202 in the FIG. 1 represents selection of articles of the group into a sub-group. A highest article approval index is determined among the unique article approval indexes of the articles of the group. The article of the group is selected into a sub-group if it complies with at least one of the following article selection criteria: the unique article approval index of the article of the group is above a predetermined approval index threshold, the unique approval index of the article of the group is equal to the highest article approval index.

A process block 203 in the FIG. 1 represents performance of the approval sequences of all articles of the sub-group. Each of the approval sequences comprises execution of a unique plurality of approval steps. Approving the article purchase request for each of the articles requires approval at all approval steps of the approval sequence, while rejecting the article purchase request for each of the articles requires rejecting at at least one of the approval steps of the approval sequence. A unique step approval index is assigned to each of the approval steps. The unique article approval index of each article is a sum of the unique step approval indexes of the approval steps of the approval sequence.

A decision block 204 in the FIG. 1 represents controlling whether all article purchase requests of the articles of the sub-group are approved. If no, the group purchase request for the sub-group of the articles is rejected and a process block 206 is executed next. If yes, the group purchase request for the sub-group of the articles is approved and a process block 205 is executed next.

The process block 205 in the FIG. 1 represents approval of the group purchase request for the group of articles.

The process block 206 in the FIG. 1 represents rejection of the group purchase request for the group of articles.

Figure 2:
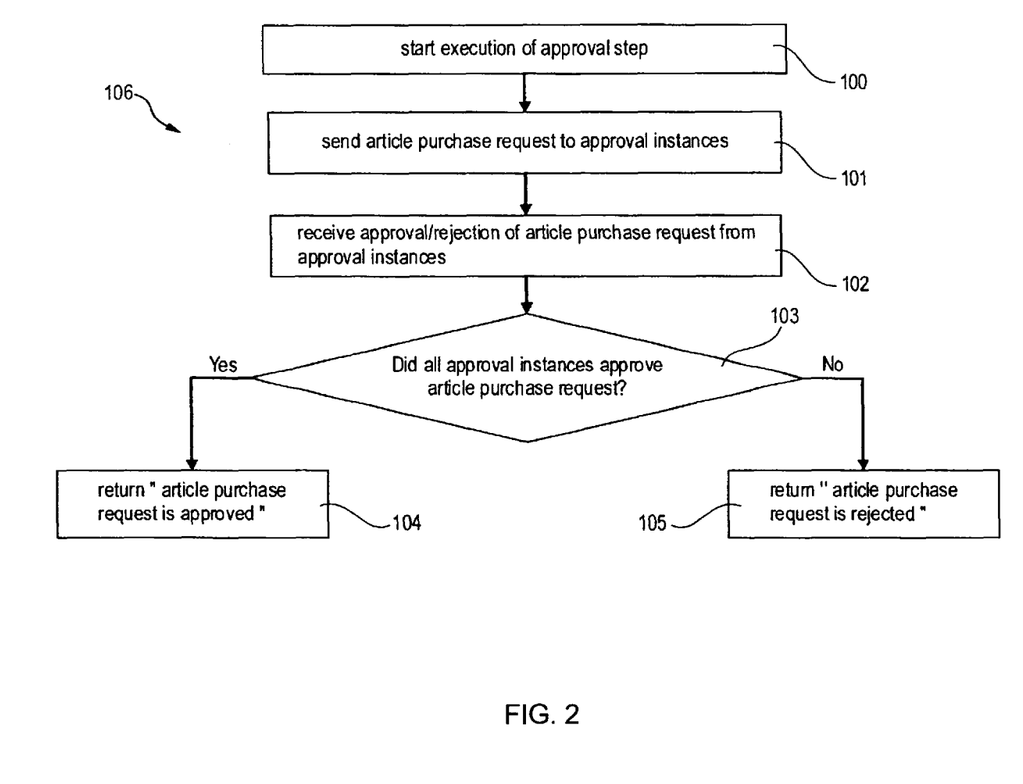
FIG. 2 is a flowchart illustrating execution of approval step, in accordance with another embodiment of the present invention.

FIG. 2 illustrates a flowchart for execution of an approval step (106). A process block 100 in the FIG. 2 represents a start of execution of an approval step.

A process block 101 in the FIG. 2 represents sending an article purchase request to approval instances. The approval instances may be but not limited to an employee of a company, software, a device. Hierarchy level of the approval instances in the company can be used for definition of the unique step approval index. For instance a step, wherein an approval of company director is required, can have higher unique step approval index than a step, wherein an approval of company project manager is required.

A process block 102 in the FIG. 2 represents receiving approval/rejection of the article purchase request from the approval instances, mentioned in a description of the process block 101.

A decision block 103 in the FIG. 2 represents controlling whether all approval instances mentioned in the operations 101 and 102 approved the article purchase request. If yes an operation 104 is executed. If no an operation 105 is executed.

A process block 104 in the FIG. 2 represents approval of the article purchase request.

A process block 105 in the FIG. 2 represents rejection of the article purchase request.

Figure 3:
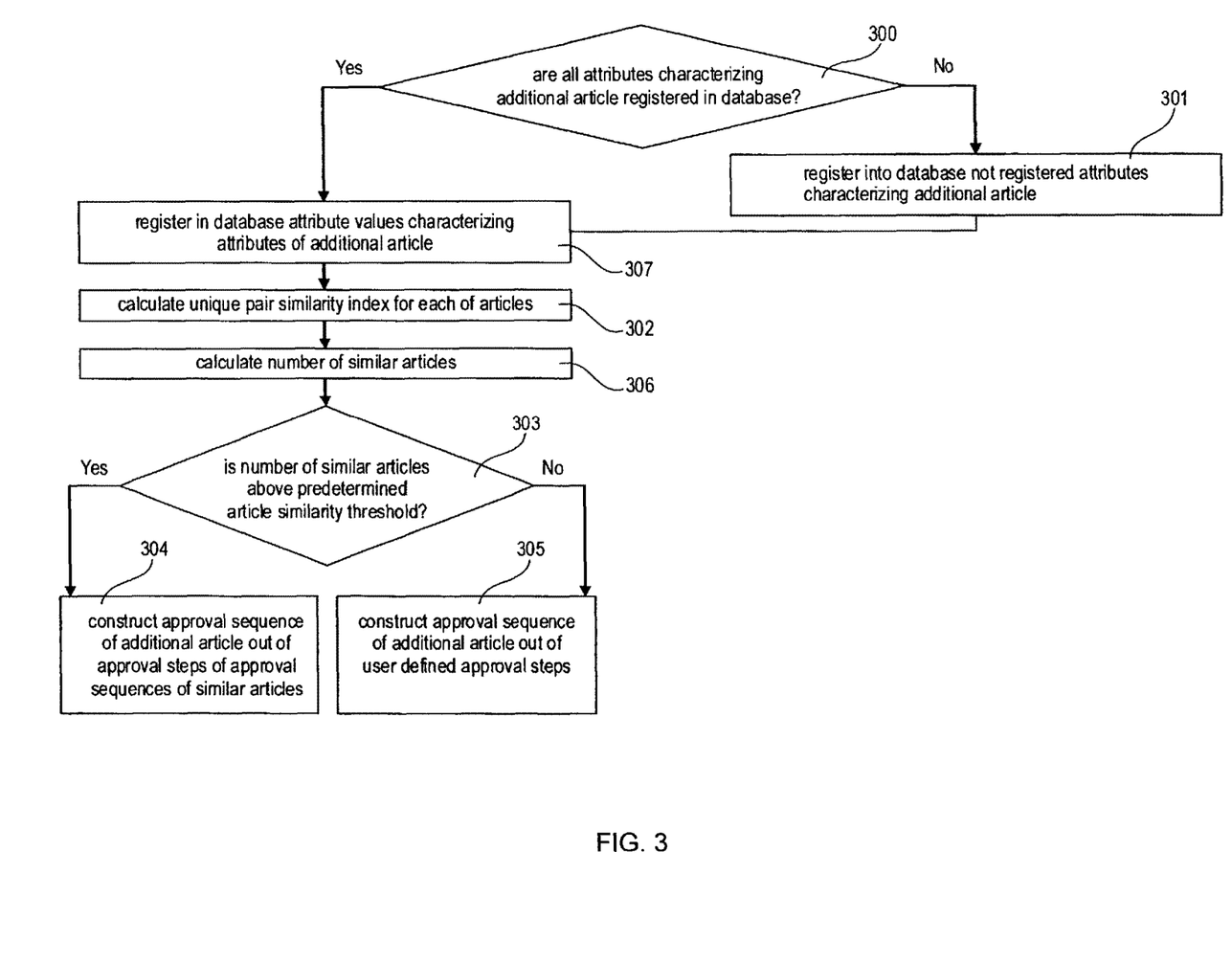
FIG. 3 is a flowchart illustrating construction of approval sequence of an additional article, in accordance with yet another embodiment of the present invention.

FIG. 3 is a flowchart for constructing an approval sequence of an additional article. A decision block 300 in the FIG. 3 represents controlling whether all attributes characterizing an additional article are registered in a database, wherein each of the articles is characterized by a dedicated plurality of attributes stored in a database. If yes, a process block 307 is executed. If no, a process block 301 is executed.

The process block 301 in the FIG. 3 represents registering in the database the not registered attributes characterizing the additional article.

The process block 307 in the FIG. 3 represents registering in the database attribute values characterizing the attributes of the additional article, wherein each attribute is characterized by a corresponding attribute value.

A process block 302 in the FIG. 3 represents calculating a unique pair similarity index for each of the articles, wherein the unique pair similarity index of the article represents a level of similarity between the article and the additional article, wherein calculating the unique pair similarity index of the article is based on an attribute similarity measurement using attributes characterizing the article and the additional article and a value similarity measurement using attribute values characterizing attributes of the article and the additional article, wherein the attribute similarity measurement represents a level of similarity between attributes of the article and the additional article, wherein the value similarity measurement represents a level of similarity between attribute values characterizing attributes of the article and the additional article.

In another embodiment the unique pair similarity index is a sum of a value of the attribute similarity measurement multiplied by a similarity weight coefficient and a value of the value similarity measurement multiplied by a value weight coefficient, wherein the similarity weight coefficient and the value weight coefficient are not negative numbers, the value of the attribute similarity measurement equals to a ratio of a number of same attributes characterizing the article and the new article to a total number of attributes characterizing the article and the additional article, the value of the value similarity measurement equals to a ratio of a number of same unique attribute values characterizing attributes of the article and the new article to a total number of attributes characterizing the article and the additional article.

Yet in another embodiment the unique pair similarity index (denoted as S) is calculated according to the following formula:

$$S = i*(c_k, l/C_k) + (1-i)*(v_k, l/V_k), \text{ wherein}$$

i is a weight parameter $0 < i < 1$;

$c_{k,l}$ is the number of same attributes characterizing the article and the new article;

$C_k$ is the total number of attributes characterizing the article and the additional article;

$v_{k,l}$ is the number of same unique attribute values characterizing attributes of the article and the new article;

$V_k$ is the total number of values characterizing attributes of the article and the new article;

k is the additional article;

l is the article.

A process block 302 in the FIG. 3 represents calculating a number of similar articles, wherein the similar articles are the articles having the unique pair similarity index above a predetermined article similarity threshold.

A decision block 303 in the FIG. 3 represents controlling whether the number of similar articles is above a predetermined similarity threshold. If yes, a process block 304 is executed. If no, a process block 305 is executed.

The process block 304 in the FIG. 3 represents constructing the approval sequence of the additional article out of the approval steps of the approval sequences of the similar articles.

The process block 305 in the FIG. 3 represents constructing the approval sequence of the additional article out of user defined approval steps. For instance the process block 305 can be performed by employees of a company.

Figure 4:
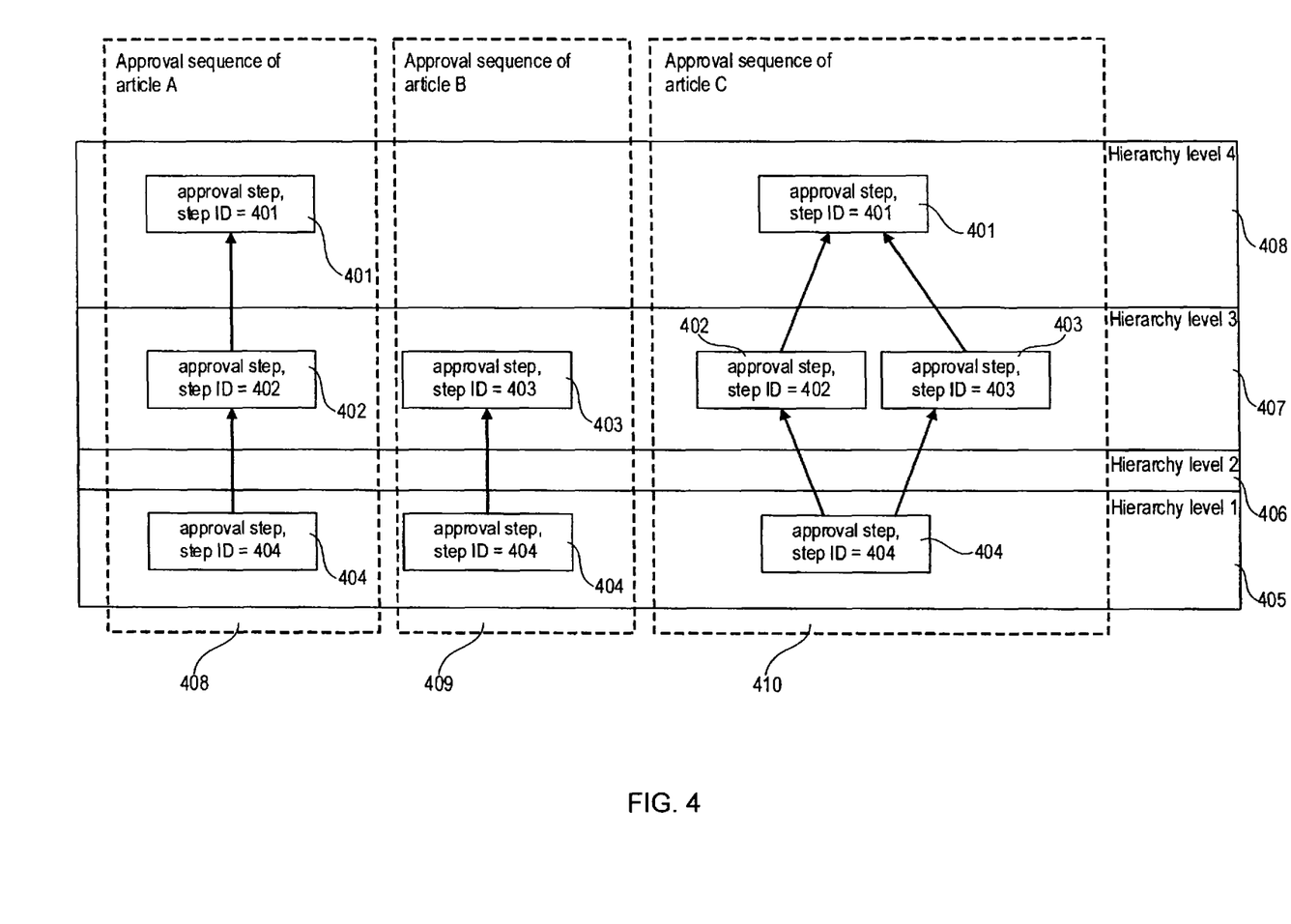
FIG. 4 is flowcharts illustrating approval sequences of articles, in accordance with yet another embodiment of the present invention.

FIG. 4 is flowcharts of approval sequences of articles A, B, and C. The approval sequence 408 of the article A consists of approval steps 401, 402, and 404. The approval sequence 409 of the article B consists of approval steps 403 and 404. The approval sequence 410 of the article C consists of the approval steps 401, 402, 403, and 404. Every approval step depicted in the FIG. 4 is associated with a hierarchy level. The approval step 404 is associated with the first hierarchy level 405. No approval steps are associated with the second hierarchy level 406. The approval steps 402 and 403 are associated with the third hierarchy level 407. The approval step 401 is associated with the fourth hierarchy level 405. A number of the approval steps are limited to 4 only for illustrative purposes. A number of the hierarchy levels are limited to 4 only for illustrative purposes as well.

FIG. 4 illustrates a principle of performance of the approval steps in the approval sequences, and a principle of construction of the approval sequence.

The principle of execution of the approval steps of the approval sequence can be formulated as follows. The approval steps of the approval sequence are performed in a sequence according to hierarchy level of the approval steps. If there is more than one approval steps in the approval sequence associated with one of the hierarchy levels then these approval steps are executed in parallel. If the article purchase request is rejected at one of the hierarchy levels then the approval sequence is terminated and the article purchase request is rejected. If the article purchase request is approved at all approval steps of the approval sequence then the article purchase request is approved.

The hierarchy levels can represent hierarchy of approval instances of the approval steps. For instance the approval step where approval of a project manager is required can be associated with the third hierarchy level, and the approval step where approval of a company director is required can be associated with the fourth hierarchy level.

For instance, the approval sequence 410 of the article C begins with execution of the approval step 404 since the approval step 404 is associated with the first hierarchy level. If the article purchase request is not rejected at the first hierarchy level performance of the approval sequence is continued, otherwise the article purchase request for the product C is rejected. Since there is no approval steps in the approval sequence associated with the second hierarchy level the approval steps 402 and 403 associated with the third hierarchy level are executed next. Since the approval steps 402 and 403 are associated with the same third hierarchy level they are executed in parallel to each other. If the article purchase request is approved at the approval steps 402 and 403 (or in other words the article purchase request is approved at the third hierarchy level 407) then the approval sequence 410 of the article C is performed further, otherwise the approval sequence 410 of the article C is terminated and the article purchase request for the article C is rejected. The last approval step 401 of the approval sequence 410 of the article C is executed. If the article purchase request for the article C is approved at the approval step 401, then the article purchase request for the article C is approved; otherwise the article purchase request for the article C is rejected.

The principle of construction of the approval sequence of the additional article out of the approval sequences of the articles can be formulated as follows. The approval sequence of the additional article is constructed by merging of the approval steps of the approval sequences of the articles, wherein association of the approval steps with the hierarchy levels remains intact. The same approval steps of the approval sequences of the articles are executed only once in the approval sequence of the additional article. Different approval steps of the approval sequences of the articles are executed in parallel in the approval sequence of the additional article, if these steps are associated with the same hierarchy level.

Construction of the approval sequence of the additional article can be illustrated on the following example. Approval sequence 410 of the article C is constructed out of the approval sequences 408 and 409 of the articles A and B. Since the approval sequence of the article A and the approval sequence of article B have the same approval step 404 associated with the first hierarchy level 405, the approval sequence 410 of the article C begins with the approval step 404 at the first hierarchy level 405. Since approval sequences 408 and 409 of the articles A and B do not have any approval steps at the second hierarchy level 406, the approval sequence 410 of the article C does not have any approval steps at the second hierarchy level 406 as well. The approval sequences 408 and 409 of the articles A and B have different approval steps 402 and 403 at the third hierarchy level 407. That is why the approval sequence 410 of the article C has both of the approval steps 402 and 403 at the third hierarchy level 407. The approval sequence 408 of the article A has the approval step 401 at the fourth hierarchy level 408, while approval sequence 409 of the article B has no approval steps at the fourth hierarchy level 408. That is why the approval sequence 410 of the article C has only one approval step 401 at the fourth hierarchy level 408.

Figure 5:
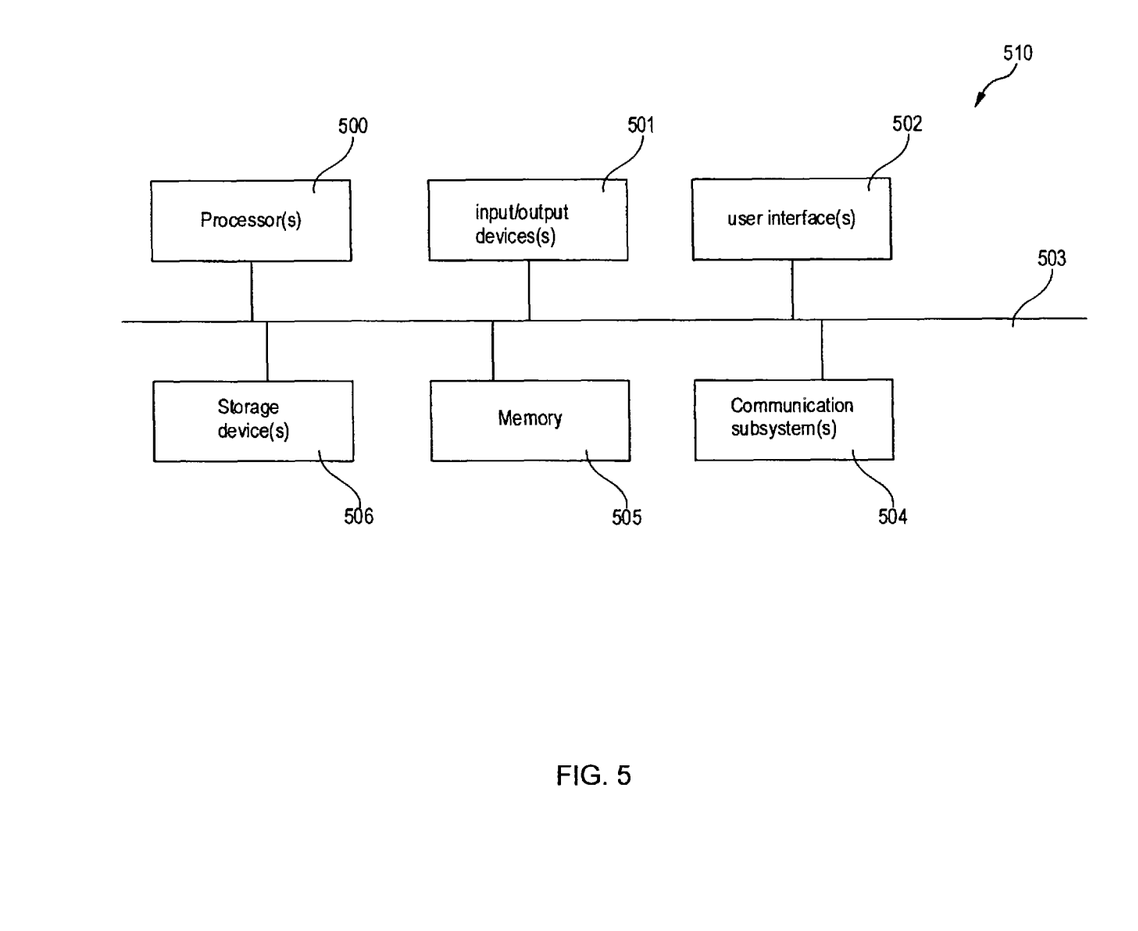
FIG. 5 is a generalized schematic diagram illustrating a computer system, which can be used in accordance with yet another embodiment of the present invention.

FIG. 5 provides a schematic illustration of one embodiment of the computer system 510 that is operable for performing the methods described in the embodiments of the invention, as described above. It should be noted that FIG. 5 provides only a generalized illustration of various components, any or all of which may be used as appropriate.

The computer system comprises, for instance, one or more processors 500, one or more input/output devices 501, one or more user interfaces 502, one or more storage devices 506, memory 505, one or more communication systems 504. All aforementioned elements can communicate with each other via a bus 503. The computer system can further comprise software elements like an operating system, application programs, and other codes. The input/output devices 501 can be used for communication with remote devices like printers, sensors, etc. The user interfaces 502 can be used for communicating with approval instances like employees of a company, or for communicating with personnel responsible for maintenance of the computer system. The storage devices 506 can be hard disks, CROMs, rewritable CDROMs, USB sticks, etc. The storage devices 506 can be used for storing data needed for execution of the methods of one or more aspects of the present invention. The memory 505 can be used by any software operating on the computer system. The memory 505 may contain data needed for execution of the methods of one or more aspects of the present invention. The communication subsystems 504 can be used for connecting the computer system with other computer systems via various networks.

Figure 6:
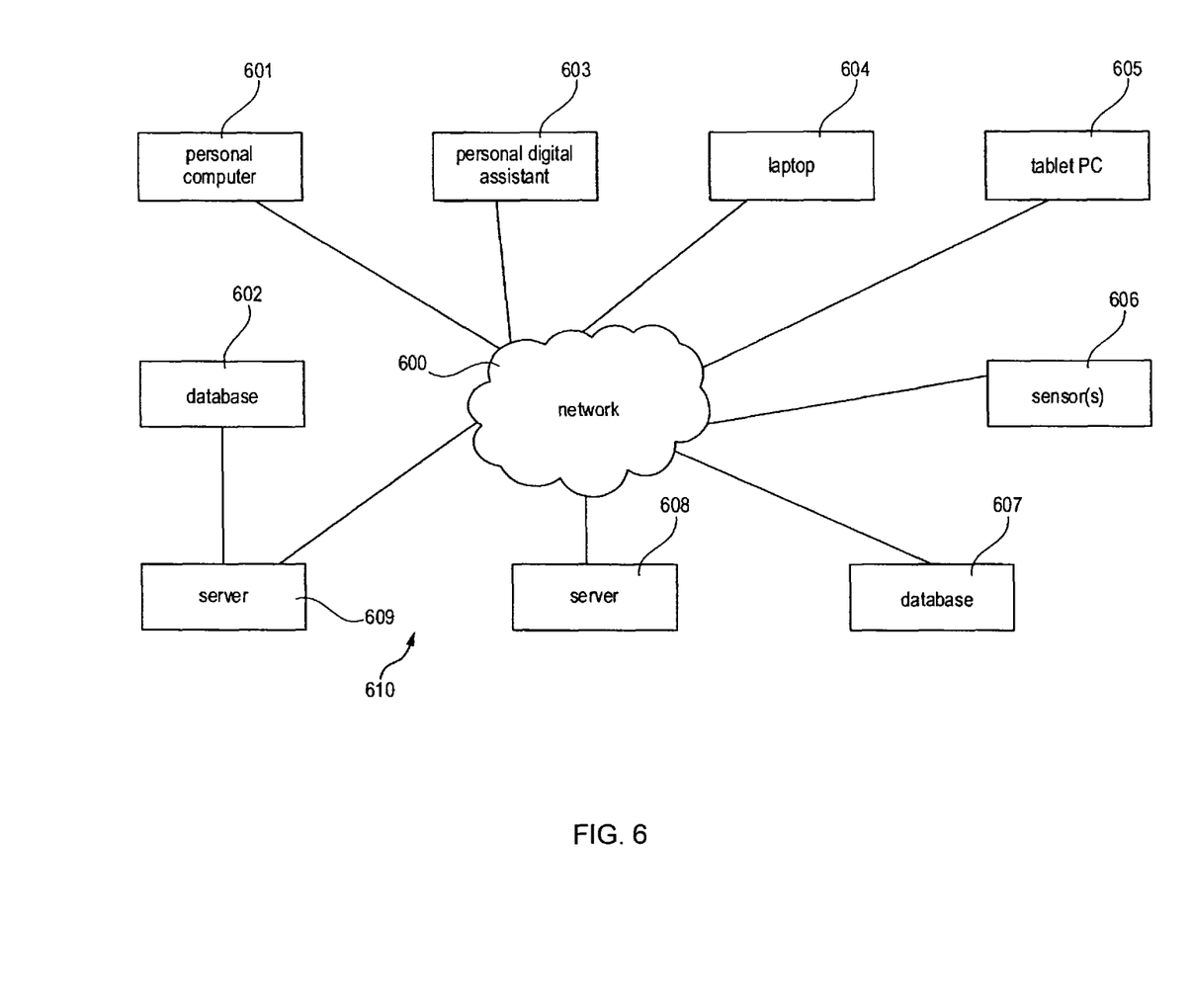
FIG. 6 is a block diagram illustrating a networked system of computers, which can be used in accordance with yet another embodiment of the present invention.

Merely by way of example, FIG. 6 illustrates a networked system of computers 610, which is operable for performing methods described in the embodiments of the present invention. Various user computer systems like a personal computer 601, a personal digital assistant 603, a laptop 604, a tablet PC 605 are connected via network 600 with one ore more sensors 606, a database 607, servers 608 and 609, wherein the sever 609 is connected to the database 602. The spectrum and number or devices are selected as such only for illustrative purposes. Any other components, any other number of any components, and any network configuration of any components can be used if appropriate. Various user computer systems can be used for communication with employees that are responsible for submitting purchase requests, approving/rejecting purchase requests, maintenance of the networked system, etc. Various remote devices like one or more sensors 606 can be integrated in the networked system, since not only employees but remote devices can operate as approval instances. Various software providing operation of the methods of one or more aspects of the present invention can be executed on servers 607 and 608. The databases 607 and 602 can contain data needed for execution of the methods of one or more aspects of the present invention. For instance, the databases 607 and 602 can contain attributes characterizing articles, attribute values, descriptions of approval sequences, description of approval steps, etc. Databases can be connected directly to a network 600 or they can be connected via a server. For instance, database 607 is directly connected to the network 600, while database 602 is connected to the network 600 via the server 609.

As described herein, a purchasing process is provided that is less time consuming and less expensive without sacrificing quality.

In one embodiment, a computer implemented method for approving a group purchase request for a group of articles is provided. The group comprises at least one article. A unique article approval index is assigned to each of the articles. A highest article approval index is determined among the unique article approval indexes of the articles of the group. The article of the group is selected into a sub-group if it complies with at least one of the following article selection criteria: the unique article approval index of the article of the group is above a predetermined approval index threshold, the unique approval index of the article of the group is equal to the highest article approval index. The method comprises: selecting the sub-group of articles, approving the group purchase request for the sub-group, rejecting the group purchase request for the sub-group, approving the group purchase request for the group if the group purchase request for the sub-group is approved, rejecting the group purchase request for the group if the group purchase request for the sub-group is rejected.

Another embodiment provides a computer system capable of approving a group purchase request for a group of articles. The group comprises at least one article. A unique article approval index is assigned to each of the articles. A highest article approval index is determined among the unique article approval indexes of the articles of the group. The article of the group is selected into a sub-group if it complies with at least one of the following article selection criteria: the unique article approval index of the article of the group is above a predetermined approval index threshold, the unique approval index of the article of the group is equal to the highest article approval index. The computer system is operable for: selecting the sub-group of articles, approving the group purchase request for the sub-group, rejecting the group purchase request for the sub-group, approving the group purchase request for the group if the group purchase request for the sub-group is approved, rejecting the group purchase request for the group if the group purchase request for the sub-group is rejected.

Yet another embodiment provides one or more machine readable storage media embodying computer instructions for approving a group purchase request for a group of articles, wherein the computer instructions cause a computer to perform a method. The group comprises at least one article. A unique article approval index is assigned to each of the articles. A highest article approval index is determined among the unique article approval indexes of the articles of the group. The article of the group is selected into a sub-group if it complies with at least one of the following article selection criteria: the unique article approval index of the article of the group is above a predetermined approval index threshold, the unique approval index of the article of the group is equal to the highest article approval index. The method comprises: selecting the sub-group of articles, approving the group purchase request for the sub-group, rejecting the group purchase request for the sub-group, approving the group purchase request for the group if the group purchase request for the sub-group is approved, rejecting the group purchase request for the group if the group purchase request for the sub-group is rejected.

All aforementioned embodiments can further comprise a portion or all of the following features and/or functionalities. The group purchase request for the group of articles comprises article purchase requests of each of the articles of the group, wherein a dedicated approval sequence is assigned to each article. Approving the article purchase request for each of the articles is performed according to the approval sequence, wherein each of the approval sequences comprises execution of a unique plurality of approval steps. Approving the article purchase request for each of the articles requires approval at all approval steps of the approval sequence, while rejecting the article purchase request for each of the articles requires rejecting at at least one of the approval steps of the approval sequence. A unique step approval index is assigned to each of the approval steps and the unique article approval index of each article is a sum of the unique step approval indexes of the approval steps of the approval sequence.

Each of the articles is characterized by a dedicated plurality of attributes and each attribute is characterized by a corresponding attribute value. The attributes and the attribute values are stored in a database. Constructing an approval sequence of an additional article can require checking whether each of the attributes characterizing an additional article is registered in the database and if not, registering each of the not registered attributes in the database. The attribute values of the attributes of the additional article can be registered in a database if the attributes of the additional article are already registered in the database. A unique pair similarity index of the article can be calculated for each article.

The unique pair similarity index represents a level of similarity between the article and the additional article, wherein calculating the unique pair similarity index of the article is based on an attribute similarity measurement using attributes characterizing the article and the additional article and a value similarity measurement using attribute values characterizing attributes of the article and the additional article. The attribute similarity measurement represents a level of similarity between attributes of the article and the additional article. The value similarity measurement represents a level of similarity between attribute values characterizing attributes of the article and the additional article. A number of similar articles can be calculated. The similar articles can be the articles having the unique pair similarity index above a predetermined article similarity threshold. The approval sequence of the additional article can be constructed out of the approval steps of the approval sequences of the similar articles if the number of similar articles is above a predetermined similarity threshold.

The unique pair similarity index can be a sum of a value of the attribute similarity measurement multiplied by a similarity weight coefficient and a value of the value similarity measurement multiplied by a value weight coefficient. The similarity weight coefficient and the value weight coefficient are not negative numbers. The value of the attribute similarity measurement equals to a ratio of a number of same attributes characterizing the article and the new article to a total number of attributes characterizing the article and the additional article. The value of the value similarity measurement equals to a ratio of a number of same unique attribute values characterizing attributes of the article and the new article to a total number of attributes characterizing the article and the additional article.

What is claimed is:

1. A computer implemented method for approving a group purchase request for a group of articles, wherein the group comprises at least one article, the method comprising:
    selecting, by one or more processors, a sub-group of articles, wherein a unique article approval index is assigned to each of the articles of the group of articles and a highest article approval index is determined among the unique article approval indexes of the articles of the group, wherein an article of the group is selected into the sub-group based on the article of the group complying with at least one of the following article selection criteria: the unique article approval index of the article of the group is above a predetermined approval index threshold, the unique article approval index of the article of the group is equal to the highest article approval index;
    generating, by the one or more processors, a dedicated approval sequence for each article, wherein approving the article purchase request for each article requires approval at all approval steps of the approval sequence, wherein the generating an approval sequence for an article comprises:
        constructing, by the one or more processors, an approval sequence of the article based on approval steps of approval sequences of one or more similar articles, wherein a number of the one or more similar articles comprise a threshold number above a predetermined similarity threshold and the one or more similar articles each have a unique pair similarity index above a predetermined article similarity threshold the constructing comprising:
            registering, by the one or more processors, in a database communicatively coupled to the one or more processors, attribute values characterizing attributes of the article, wherein each attribute is characterized by a corresponding attribute value;
            determining, by the one or more processors, a level of similarity between values of registered attributes of the article and values of registered attributes of one or more articles registered in the database;
            based on the level of similarity, calculating, by the one or more processors, a unique pair similarity index for the article and each of the one or more articles, wherein the unique pair similarity index represents a level of similarity between the article and each of the one or more articles;
            determining, by the one or more processors, which of the one or more articles comprise one or more similar articles by determining for which of the one or more articles the unique pair similarity index of the article and an article of the one or more articles is above a predetermined article similarity threshold;
            determining, by the one or more processors, that the number of articles in the one or more similar articles is above the a threshold number; and
            constructing, by the one or more processors, the approval sequence of the article out of the approval steps of the approval sequences of the one or more similar articles; and
    receiving, by the one or more processors, a group purchase request for the group of articles comprising an article purchase request of each of the articles of the group; and
    automatically approving, by the one or more processors, the group purchase request for the group based on approval of a group purchase request for the sub-group, based on automatically applying the dedicated approval sequence for each article.

2. The method of claim 1, wherein a unique step approval index is assigned to each of the approval steps, wherein the unique article approval index of the article is a sum of the unique step approval indexes of the approval steps of the approval sequence.

3. The method of claim 1, wherein
    the unique pair similarity index is a sum of a value of the attribute similarity measurement multiplied by a similarity weight coefficient and a value of the value similarity measurement multiplied by a value weight coefficient;
    the similarity weight coefficient and the value weight coefficient are not negative numbers;
    the value of the attribute similarity measurement equals to a ratio of a number of same attributes characterizing the article and the additional article to a total number of attributes characterizing the article and the additional article; and
    the value of the value similarity measurement equals to a ratio of a number of same unique attribute values characterizing attributes of the article and the additional article to a total number of attributes characterizing the article and the additional article.

4. A computer program product of approving a group purchase request for a group of articles, wherein the group comprises at least one article, the computer program product comprising:
- a computer readable storage medium readable by a processing circuit and storing instructions for execution by the processing circuit for performing a method comprising:
  - selecting, by one or more processors, a sub-group of articles, wherein a unique article approval index is assigned to each of the articles of the group of articles and a highest article approval index is determined among the unique article approval indexes of the articles of the group, wherein an article of the group is selected into the sub-group based on the article of the group complying with at least one of the following article selection criteria: the unique article approval index of the article of the group is above a predetermined approval index threshold, the unique article approval index of the article of the group is equal to the highest article approval index;
  - generating, by the one or more processors, a dedicated approval sequence for each article, wherein approving the article purchase request for each article requires approval at all approval steps of the approval sequence, wherein the generating an approval sequence for an article comprises:
    - constructing, by the one or more processors, an approval sequence of the article based on approval steps of approval sequences of one or more similar articles, wherein a number of the one or more similar articles comprise a threshold number above a predetermined similarity threshold and the one or more similar articles each have a unique pair similarity index above a predetermined article similarity threshold the constructing comprising:
      - registering, by the one or more processors, in a database communicatively coupled to the one or more processors, attribute values characterizing attributes of the article, wherein each attribute is characterized by a corresponding attribute value;
      - determining, by the one or more processors, a level of similarity between values of registered attributes of the article and values of registered attributes of one or more articles registered in the database;
      - based on the level of similarity, calculating, by the one or more processors, a unique pair similarity index for the article and each of the one or more articles, wherein the unique pair similarity index represents a level of similarity between the article and each of the one or more articles;
      - determining, by the one or more processors, which of the one or more articles comprise one or more similar articles by determining for which of the one or more articles the unique pair similarity index of the article and an article of the one or more articles is above a predetermined article similarity threshold;
      - determining, by the one or more processors, that the number of articles in the one or more similar articles is above the a threshold number; and
      - constructing, by the one or more processors, the approval sequence of the article out of the approval steps of the approval sequences of the one or more similar articles; and
  - receiving, by the one or more processors, a group purchase request for the group of articles comprising an article purchase request of each of the articles of the group; and
  - automatically approving, by the one or more processors, the group purchase request for the group based on approval of a group purchase request for the sub-group, based on automatically applying the dedicated approval sequence for each article.

5. The computer program product of claim 4, wherein a unique step approval index is assigned to each of the approval steps, wherein the unique article approval index of the article is a sum of the unique step approval indexes of the approval steps of the approval sequence.

6. The computer program product of claim 4, wherein
the unique pair similarity index is a sum of a value of the attribute similarity measurement multiplied by a similarity weight coefficient and a value of the value similarity measurement multiplied by a value weight coefficient;
the similarity weight coefficient and the value weight coefficient are not negative numbers;
the value of the attribute similarity measurement equals to a ratio of a number of same attributes characterizing the article and the additional article to a total number of attributes characterizing the article and the additional article; and
the value of the value similarity measurement equals to a ratio of a number of same unique attribute values characterizing attributes of the article and the additional article to a total number of attributes characterizing the article and the additional article.

7. A computer system of approving a group purchase request for a group of articles, wherein the group comprises at least one article, the computer system comprising:
- a memory; and
- a processor in communications with the memory, wherein the computer system is configured to perform a method, said method comprising:
  - selecting, by one or more processors, a sub-group of articles, wherein a unique article approval index is assigned to each of the articles of the group of articles and a highest article approval index is determined among the unique article approval indexes of the articles of the group, wherein an article of the group is selected into the sub-group based on the article of the group complying with at least one of the following article selection criteria: the unique article approval index of the article of the group is above a predetermined approval index threshold, the unique article approval index of the article of the group is equal to the highest article approval index;
  - generating, by the one or more processors, a dedicated approval sequence for each article, wherein approving the article purchase request for each article requires approval at all approval steps of the approval sequence, wherein the generating an approval sequence for an article comprises:
    - constructing, by the one or more processors, an approval sequence of the article based on approval steps of approval sequences of one or more similar articles, wherein a number of the one or more similar articles comprise a threshold number above a predetermined similarity threshold and the one or more similar articles each have a unique pair similarity index above a predetermined article similarity threshold the constructing comprising:

registering, by the one or more processors, in a database communicatively coupled to the one or more processors, attribute values characterizing attributes of the article, wherein each attribute is characterized by a corresponding attribute value;

determining, by the one or more processors, a level of similarity between values of registered attributes of the article and values of registered attributes of one or more articles registered in the database;

based on the level of similarity, calculating, by the one or more processors, a unique pair similarity index for the article and each of the one or more articles, wherein the unique pair similarity index represents a level of similarity between the article and each of the one or more articles;

determining, by the one or more processors, which of the one or more articles comprise one or more similar articles by determining for which of the one or more articles the unique pair similarity index of the article and an article of the one or more articles is above a predetermined article similarity threshold;

determining, by the one or more processors, that the number of articles in the one or more similar articles is above the a threshold number; and constructing, by the one or more processors, the approval sequence of the article out of the approval steps of the approval sequences of the one or more similar articles; and receiving, by the one or more processors, a group purchase request for the group of articles comprising an article purchase request of each of the articles of the group; and automatically approving, by the one or more processors, the group purchase request for the group based on approval of a group purchase request for the sub-group, based on automatically applying the dedicated approval sequence for each article.

8. The computer system of claim 7, wherein a unique step approval index is assigned to each of the approval steps, wherein the unique article approval index of the article is a sum of the unique step approval indexes of the approval steps of the approval sequence.

9. The computer system of claim 7, wherein
the unique pair similarity index is a sum of a value of the attribute similarity measurement multiplied by a similarity weight coefficient and a value of the value similarity measurement multiplied by a value weight coefficient;
the similarity weight coefficient and the value weight coefficient are not negative numbers;
the value of the attribute similarity measurement equals to a ratio of a number of same attributes characterizing the article and the additional article to a total number of attributes characterizing the article and the additional article; and
the value of the value similarity measurement equals to a ratio of a number of same unique attribute values characterizing attributes of the article and the additional article to a total number of attributes characterizing the article and the additional article.

* * * * *